July 9, 1968    J. A. FAVRE    3,392,060

QUICK-OPENING BATTERY CAP CLOSURE

Filed April 27, 1966    3 Sheets-Sheet 1

INVENTOR
J. A. FAVRE

BY Young & Quigg

ATTORNEYS

July 9, 1968          J. A. FAVRE          3,392,060

QUICK-OPENING BATTERY CAP CLOSURE

Filed April 27, 1966          3 Sheets-Sheet 2

INVENTOR
J. A. FAVRE

BY *Young & Quigg*

ATTORNEYS

July 9, 1968 J. A. FAVRE 3,392,060
QUICK-OPENING BATTERY CAP CLOSURE
Filed April 27, 1966 3 Sheets-Sheet 3

INVENTOR
J. A. FAVRE
BY Young & Quigg
ATTORNEYS 3,392,060
QUICK-OPENING BATTERY CAP CLOSURE
John A. Favre, Bartlesville, Okla., assignor to Phillips
Petroleum Company, a corporation of Delaware
Filed Apr. 27, 1966, Ser. No. 545,744
2 Claims. (Cl. 136—177)

ABSTRACT OF THE DISCLOSURE

An adjustable closure for the cell openings of a multi-cell storage battery comprises a pair of overlapping members, slotted in their overlapping sections to accommodate the neck of a threaded stopper extending thru the slots and terminating in a knob, a thread-free stopper on the outer end of each member, and a loop or ring around the members at each overlapping end, the contacting surface of at least one of the members being convex longitudinally to bias the end stoppers in their respective cell openings.

---

Figure 1:
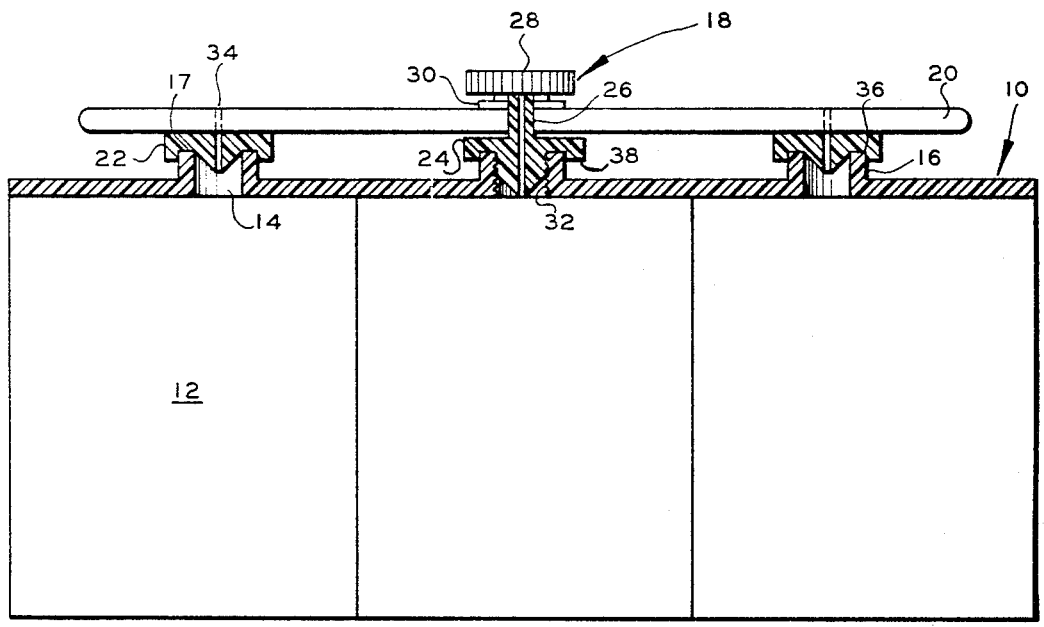

This invention relates to a quick-opening closure for a wet multi-cell storage battery.

In servicing wet multi-cell electrical storage batteries, considerable time is consumed by service station attendants and other maintenance workers in unscrewing and replacing each cell cap. With the increased use of larger batteries with additional cells, even more time consumption is involved in servicing.

This invention is concerned with a unitary closure assembly for multiple-cell wet storage batteries which materially reduces the time required in servicing such batteries.

Accordingly, it is an object of the invention to provide an improved closure for wet multiple-cell electrical storage batteries. Another object is to provide a unitary closure assembly for closing and sealing the several cell openings of a wet multi-cell electrical storage battery. Another object is to provide a closure assembly for a wet multi-cell electrical storage battery which conserves time in servicing such batteries. Other objects of the invention will become apparent to one skilled in the art upon consideration of the accompanying disclosure.

The invention provides a unitary closure assembly for the several cell openings of a wet-cell electrical storage battery, which comprises a generally rectangular plate adapted to overlay said openings; an individual stopper for each cell opening positioned on the underside of said plate in a pattern corresponding to the pattern of said openings, at least one but not all of said stoppers being threaded and the corresponding opening being threaded to receive the threaded stopper in sealed relation; a stem extending from the threaded stopper thru the plate in rotatable relation therewith; and a knob on said stem for rotating the threaded stopper, holding said stopper in closely spaced relation or engagement with said plate, and forcing the thread-free stoppers into sealing engagement with their respective openings. In a three-cell battery, the plate is provided with a central threaded stopper which threads into a threaded opening in the center cell and with fixed or longitudinally slidable thread-free stoppers adjacent the ends of the plate for covering the two outer cells. A similar parallel arrangement of stoppers may be provided in the plate to cover the cell openings in a six-cell (12-volt battery) comprising two rows of cells. Also, three rows of stoppers are provided for an 18-volt, three-row design or cell arrangement.

The assembly is preferably constructed so that the outer stoppers (adjacent the ends of the plate) seat in their respective openings before the threaded stopper is completely threaded into its cell opening. This is accomplished either by constructing the plate to which the stoppers are attached in arcuate or convex form (crowned upwardly from end-to-end) or by forming the plate with its bottom surface in a plane and providing thread-free stoppers with closure surfaces at a selected distance from the plate which brings these surfaces into sealing contact with their respective cell openings before the threaded stopper(s) is completely screwed into its opening.

Figure 2:
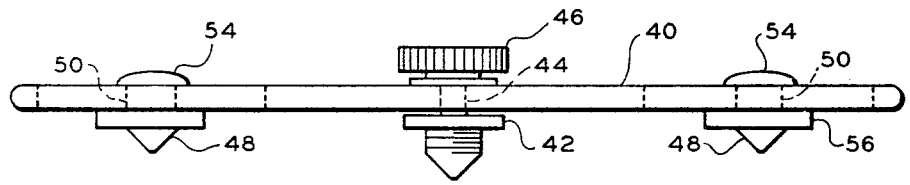
Figure 3:
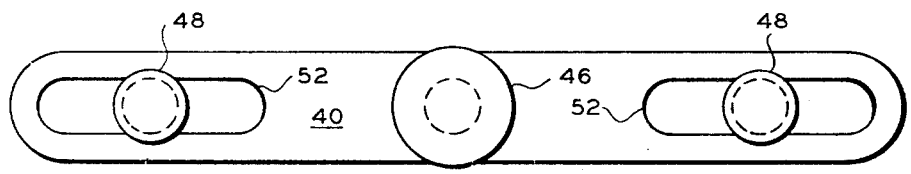
Figure 4:
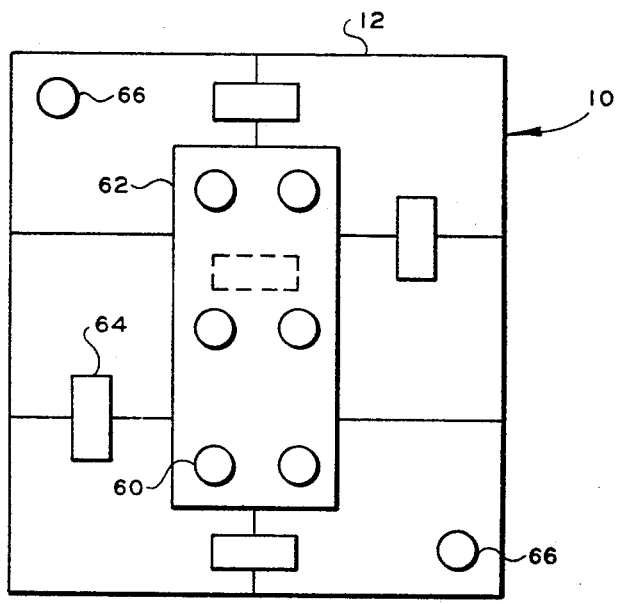
Figure 5:
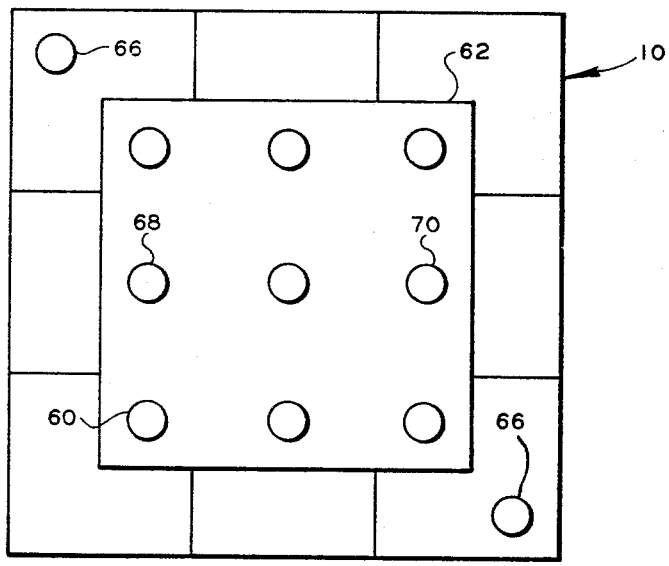
Figure 6:
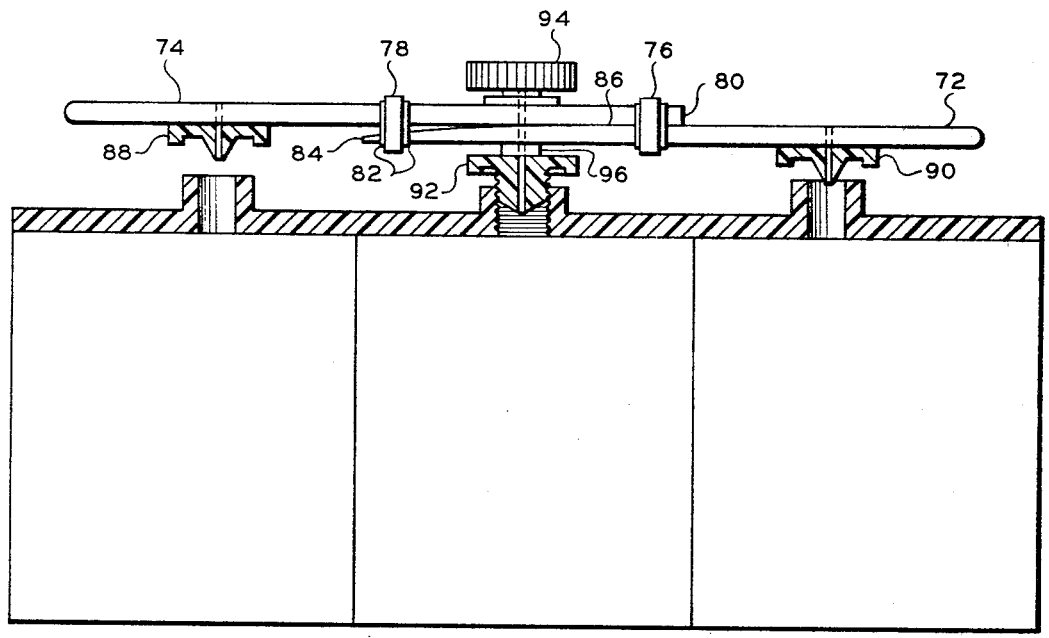
Figure 7:
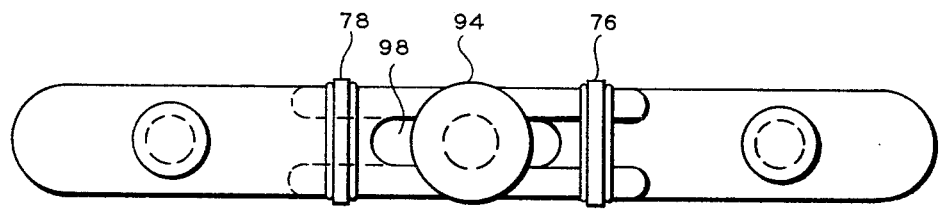

A more complete understanding of the invention may be had by reference to the accompanying schematic drawing of which FIGURE 1 is a partial vertical section of a storage battery and closure assembly in accordance with the invention; FIGURE 2 is an elevation of another embodiment of the closure assembly; FIGURE 3 is a plan view of the closure assembly of FIGURE 2; FIGURE 4 is a plan view of a closure on a 12-volt storage battery having six cells; FIGURE 5 is a plan view of a closure assembly of an 18-volt storage battery having nine cells; FIGURE 6 is an elevation in partial section of another embodiment of a closure assembly for a three-cell battery; and FIGURE 7 is a plan view of the assembly of FIGURE 6.

Referring to FIGURE 1, a storage battery 10 comprises three separate cells 12, each of which is provided with an opening 14 for introducing water and/or acid and venting vapor to accommodate expansion. Each opening is provided with an upwardly extending annular flange 16 which has an upper end plane surface for sealing with a suitable stopper or closure.

Closure assembly 18 comprises a plate 20 which overlays the several cell openings, end stoppers 22, and central stopper 24. End stoppers 22 are either attached to or formed integral with plate 20. Central stopper 24 is provided with a stem 26 extending thru a hole in plate 20 in rotatable relation therewith. On the upper end of stem 26 is positioned a knob 28 including an expanded section 30 which holds stopper 24 in a selected position relative to the bottom surface of plate 20. Stopper 24 is provided with threads 32 which match corresponding threads in its respective opening 14. Each of the stoppers is provided with a vent 34 for ingress and egress of gas and vapor upon cooling and heating of the cell.

The sealing surface 36 of thread-free stoppers 22 is spaced a short distance from the bottom surface of plate 20 and the sealing surface of ring 16 of the threaded opening for stopper 24 may seat directly on the bottom of plate 20 or sealing of the central opening may depend upon threading stopper 24 into a seat in its opening as shown. When turning knob 28 to screw stopper 24 into its receptacle, surfaces 36 contact the upper surface of rings 16 before the upper sealing surface 17 of central ring 16 surrounding stopper 24 seals on the bottom surface of plate 20 or before stopper 24 is seated, thereby biasing stoppers 22 against their sealing surfaces 17. A ring 38 depending from plate 20 surrounds central ring 16 to aid in preventing contamination of the middle cell while the battery is in service.

Referring to FIGURES 2 and 3, arcuate plate 40 is provided with a central stopper 42 having a stem 44 extending thru a hole in plate 40 in loose fit therewith for rotation. A knob 46 on the upper end of stem 44 serves to screw stopper 42 into and out of its respective threaded opening and to maintain a set spacing between the upper surface of the stopper 42 and the bottom surface of plate 40. End stoppers 48 are provided with stems 50 which extend thru longitudinal slots 52 in plate 40 and are joined to a head or expanded section 54 on the upper end thereof. Head 54 prevents the falling out of the stoppers from plate 40 and slot 52 allows for adjustment in the spacing between central stopper 42 and outer stoppers 48 in accordance with the spacing of the cell openings of differently designed batteries. Slots 52 may be any suitable length to accommodate a wide range of spacing of cell openings. Plate 40 is upwardly crowned from end-to-end so that upon screwing stopper 42 into its central cell opening, pressure is applied on stoppers 48 to force them against the sealing surfaces of their respective openings. In the design or configuration illustrated, surface 56, which is a plane annular surface, seals directly against the upper surface of an upwardly projecting annular ring around the cell opening. Other sealing arrangements may be utilized with any of the embodiments of the invention illustrated.

Referring to FIGURE 4, battery 10 comprises two rows of cells 12 with their cell openings arranged in a compact configuration covered by stoppers which terminate in knobs or heads 60 connected with stems extending thru plate 62. Plate 62 may be designed in a similar manner to plate 20 of FIGURE 1 or similar to plate 40 of FIGURES 2 and 3. Either one or both of the central stoppers may be threaded into their respective openings. The various cells are connected by conductors 64 and posts or terminals 66 are provided at diagonally opposite corners of the battery.

Referring to FIGURES 5, battery 10 is similar to battery 10 of FIGURE 4, with the addition of an extra row of cells. Plate 62 overlays all of the cell openings and is provided with properly spaced stoppers directly under knobs or heads 60. In the arrangement shown, only the central stopper under the knob positioned at the intersection of the diagonals of the rectangular plate 62 need be threaded to attach the closure assembly to the battery. However, it is also preferable to thread the stoppers under both knobs 68 and 70 to more firmly and uniformly attach the closure assembly to the battery. Plate 62, when utilized to cover a substantial number of cells, may be in filigree form or reticulate, this form or design economizing on material.

In FIGURES 6 and 7, the plate in the closure assembly is formed of overlapping sections 72 and 74 which are held in engagement by loops or rings 76 and 78. Rings 76 and 78 are generally rectangular rings with a rectangular opening to fit the generally rectangular cross section of plate sections 72 and 74. Ring 76 is affixed to end 80 of section 74 between beads 82 so that it does not slide on this section but allows section 72 to slide therethru. Ring 78 is positioned on section 72 between beads 82 adjacent end 84. Surface 86 of lower section 72 is longitudinally convex so as to position stoppers 88 and 90 in a biasing position when central stopper 92 is threaded into its respective threaded opening. Stopper 92 is provided with a turning knob 94 and a stem 96 similar to those of stopper 24 in FIGURE 1. In order to provide adjustability in the spacing of stoppers to fit differently designed storage batteries, matching slots 98 are provided in sections 72 and 74 to permit sliding of sections 72 and 74 longitudinally over each other.

Because of the corrosive ambient in which the closure assembly in utilized, it is well to construct this device of non-corrodible materials. All of the parts of the device disclosed are preferably fabricated of resins or polymers such as Marlex (trademark of Phillips Petroleum Company for high-density polyolefins) or other similar polymers and resins. Polyamides and fluorocarbon plastics may also be used as materials of construction for the closure assembly. The invention, however, does not lie in the specific materials of which the device is made but rather in the cooperative arrangement of the elements in the combination and in certain configurations of the elements.

Certain modifications of the invention will become apparent to those skilled in the art and the illustrative details disclosed are not to be construed as imposing unnecessary limitations on the invention.

I claim:
1. A closure for the several cell openings of a wet-cell storage battery comprising:
    (a) a cover plate comprising a pair of overlapping members slidable longitudinally over each other;
    (b) longitudinal matching slots in the overlapping sections of said members;
    (c) a threaded stopper adjacent the center of the plate of (a) having a stem extending thru the slots of (b) and terminating in a knob adjacent the upper side of the upper of said members;
    (d) a thread-free stopper depending from the outer end of each said member of (a), the contacting surface of at least one of said members being longitudinally convex to bias each thread-free stopper in its respective opening before said threaded stopper is in sealing position in its opening; and
    (e) a loop or ring at each overlapping end of said members holding said members in slidable engagement.

2. The closure of claim 1 wherein one said loop or ring is fixed to the underneath end and the other said loop or ring is fixed to the on-top end.

References Cited

UNITED STATES PATENTS

| 2,281,800 | 5/1942 | Riedesel. |
| 2,570,123 | 10/1951 | Heine. |
| 2,786,881 | 3/1957 | Lewis. |
| 2,881,239 | 4/1959 | Fingerhut. |
| 2,889,391 | 6/1959 | Marshall. |

WINSTON A. DOUGLAS, *Primary Examiner.*

DONALD L. WALTON, *Assistant Examiner.*